United States Patent
von Hasselbach et al.

(10) Patent No.: US 9,878,588 B2
(45) Date of Patent: *Jan. 30, 2018

(54) WHEEL CARRIER OF A VEHICLE WITH CLAMP FIT CONNECTION

(71) Applicant: Bayerische Motoren Werke Aktiengesellschaft, Munich (DE)

(72) Inventors: Johannes von Hasselbach, Munich (DE); Thomas Boeschl, Munich (DE); Florian Woelfle, Munich (DE); Marius Wenk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 4 days.

This patent is subject to a terminal disclaimer.

(21) Appl. No.: 14/793,908

(22) Filed: Jul. 8, 2015

(65) Prior Publication Data

US 2016/0009153 A1    Jan. 14, 2016

(30) Foreign Application Priority Data

Jul. 9, 2014   (DE) .................. 10 2014 213 364

(51) Int. Cl.
| *B60G 3/01* | (2006.01) |
| *B60G 7/00* | (2006.01) |
| *B60G 13/00* | (2006.01) |

(52) U.S. Cl.
CPC ............ *B60G 3/01* (2013.01); *B60G 7/001* (2013.01); *B60G 13/005* (2013.01); *B60G 2204/4304* (2013.01); *B60G 2206/50* (2013.01)

(58) Field of Classification Search
CPC .. B62D 21/15; B62D 21/155; B60Y 2306/01; B60G 3/01; B60G 13/005; B60G 7/001; B60G 2204/4304; B60G 2206/50; B60G 2204/4308; B60G 2206/016
See application file for complete search history.

(56) References Cited

U.S. PATENT DOCUMENTS

| 4,274,654 A * | 6/1981 | Travaglio ............ B60G 13/006 |
| | | 280/124.154 |
| 7,850,227 B2 * | 12/2010 | Tamakoshi ............ B62D 21/11 |
| | | 296/193.09 |

(Continued)

FOREIGN PATENT DOCUMENTS

DE            195 42 496 C1    10/1996

*Primary Examiner* — Paul N Dickson
*Assistant Examiner* — Timothy Wilhelm
(74) *Attorney, Agent, or Firm* — Crowell & Moring LLP

(57) ABSTRACT

A wheel carrier of a vehicle has a clamp fit connection to a further component, preferably a suspension strut. The wheel carrier includes a screw connection with a screw for clamping the clamp fit connection, and a lever with a fastening portion and an impact portion. The fastening portion is fastened under a head of the screw or under a nut of the screw connection. The impact portion protrudes from the fastening portion in such a manner that, in the event of a vehicle crash and the associated deformation, a part of the vehicle brings about a force on the impact portion in order at least partially to release the screw connection. The fastening portion is designed in order at least partially to break out from under the head or the nut during the action of force on the lever.

20 Claims, 3 Drawing Sheets

(56) References Cited

U.S. PATENT DOCUMENTS

| | | | |
|---|---|---|---|
| 8,480,130 B2* | 7/2013 | Dandekar | B62D 21/11 |
| | | | 280/784 |
| 8,550,543 B2* | 10/2013 | Yoshida | B62D 21/155 |
| | | | 280/784 |
| 8,628,139 B2* | 1/2014 | van Oirschot | B62D 21/155 |
| | | | 296/187.09 |
| 8,870,224 B2* | 10/2014 | Dandekar | B62D 21/11 |
| | | | 280/784 |
| 9,115,778 B2* | 8/2015 | Wagner | B60G 11/08 |
| 9,216,766 B2* | 12/2015 | Kerstan | B60B 35/00 |
| 9,302,706 B2* | 4/2016 | van der Jagt | B62D 7/18 |
| 2013/0241166 A1* | 9/2013 | Paintmayer | B60G 7/02 |
| | | | 280/124.125 |
| 2015/0307133 A1* | 10/2015 | Mentzel | B60G 13/005 |
| | | | 280/784 |

* cited by examiner

WHEEL CARRIER OF A VEHICLE WITH CLAMP FIT CONNECTION

CROSS REFERENCE TO RELATED APPLICATION

This application claims priority under 35 U.S.C. § 119 from German Patent Application No. 10 2014 213 364.5, filed Jul. 9, 2014, the entire disclosure of which is herein expressly incorporated by reference.

BACKGROUND AND SUMMARY OF THE INVENTION

The present invention relates to a wheel carrier of a vehicle with a clamp fit connection to a further component. The further component is, in particular, a suspension strut for connecting the wheel carrier to the body of the vehicle.

In principle, it is endeavored to design a vehicle, for example a passenger vehicle, to be as safe as possible even in the event of an accident, that is to say, when the vehicle strikes against an obstacle (=crash). In order to minimize the risk of injury for the vehicle occupants in the event of such an impact, the vehicle parts which, as viewed in the direction of travel, are located in front of the vehicle interior, i.e. the vehicle front end structure, are, as far as possible not intended to penetrate the vehicle interior due to the impact. With regard to the front wheels of the vehicle, the wheel-guiding links are designed, for example, in such a manner that the wheel is pivoted laterally outward in the event of an "offset impact", wherein, according to DE 195 42 496 C 1, a rear transverse link strut can be deformed longitudinally, that is to say, can be shortened, in an energy-absorbing manner for this purpose.

It is the object of the present invention to provide a wheel carrier for a vehicle, which permits safe operation during the normal operation of the vehicle and also in the event of a crash, while being cost-effective to produce and install. In particular, it is intended to provide an advantageous measure, with the aid of which a front wheel of a vehicle in the event of a head-on crash or a rear wheel of a vehicle in the event of a rear crash can be partially released, as it were, from the wheel guide thereof such that the wheel can move in a desired manner and does not put the occupants at risk.

This and other objects are achieved by a wheel carrier of a vehicle, in particular a motor vehicle. The wheel carrier has a clamp fit connection. The wheel carrier is connectable to a further component via the clamp fit connection. The further component is, in particular, a suspension strut or the like. The wheel carrier comprises a screw connection with a screw for clamping the clamp fit connection. For this purpose, a hole is provided, in which the screw fits. The screw is either screwed into a thread in the hole, or a nut or the like is provided at the end of the screw. By tightening of the screw connection, the further component, in particular the suspension strut, can be clamped via the clamp fit connection.

Furthermore, a lever is provided. The lever has a fastening portion and an impact portion. The lever is fastened to the clamp fit connection via the fastening portion. Here, for example, a passage hole is provided in the fastening portion. The screw of the screw connection protrudes through the passage hole. The fastening portion of the lever is therefore clamped under the screw head or the nut of the screw connection. The impact portion protrudes from the fastening portion. In the event of a crash, the vehicle is deformed. The impact portion is arranged in such a manner that part of the deforming vehicle or the obstacle or the barrier strikes against the impact portion of the lever and therefore brings about a force on the impact portion. This action of force initially stretches the screw until the fastening portion breaks. As soon as the fastening portion breaks out from under the screw head or under the nut, the screw loses approximately the entire prestressing force thereof. As a result, the clamp fit connection is at least partially released.

Owing to the released clamp fit connection, the wheel carrier can move in relation to the further component, in particular the suspension strut. As a result, it is possible for the wheel, which is located on the wheel carrier, to execute a desired movement during the crash. In particular, in the case of the front axle, there is always the risk that the wheel, in particular the rim or the brake disk, will cause high degrees of intrusion into the vehicle body if the wheel strikes against the sill too far on the inside. In the worst case, the wheel penetrates the floor or foot well of the vehicle. If the connection between suspension strut and wheel carrier remains intact for too long, this negative wheel behavior arises. The wheel then cannot be released outward but rather is trapped in a circular path about the upper suspension strut connection. The spring support is prevented from shifting inward, which additionally has a negative effect. With the lever according to the invention, it is ensured that the clamp fit connection between wheel carrier and suspension strut is released. The wheel carrier or the wheel can thereby move correspondingly outward such that the wheel only slightly overlaps, if at all, with the sill.

It is advantageously provided that at least one material tapering or material recess is formed in the fastening portion. The material tapering or material recess constitutes a corresponding predetermined breaking point in the fastening portion of the lever. The predetermined breaking point enables the fastening portion to break out from under the screw head or from under the nut in a targeted manner during the crash. Alternatively, however, the fastening portion can also be formed unstably without a defined predetermined breaking point in such a manner that the fastening portion breaks out under a corresponding loading during a crash.

A fastening hole is advantageously located in the fastening portion of the lever. The screw of the screw connection protrudes through the fastening hole. The material tapering or material recess is advantageously designed in such a manner that it reaches as far as the edge of the fastening hole. As a result, an adequate predetermined breaking point is possible in the fastening portion with simple measures.

The material recess is particularly advantageously designed as a longitudinal slot or as a groove in the fastening portion. Such a longitudinal slot or a groove is simple to manufacture and safely enables the fastening portion to break out.

Furthermore, it is preferably provided that the material tapering or material recess at least partially runs under the head or under the nut. Of course, a shim or the like can also be arranged under the head or under the nut. If, as preferably provided here, the material tapering or material recess is also arranged under the head or under the nut, it can very readily be ensured that even the part of the fastening portion that is located under the head or under the nut breaks out at the same time.

The impact portion advantageously has an angle of less than 90° with respect to the fastening portion. As a result, the lever is of V-shaped design. A space-saving arrangement of the lever is thereby possible. Furthermore, the impact portion can thus be placed in such a manner that said impact portion is struck, for example, by a deforming rim or by the brake disk when the vehicle is deformed during the crash. In particular, it is provided for this purpose that one end of the impact portion and the transition of the fastening portion into the impact portion lie on opposite sides of the longitudinal axis of the screw. The clamp fit connection is advantageously designed as a clip. This clip is an integral part of the wheel carrier. The clip customarily has a slot. The slot divides the hole of the clamp fit connection, in which the screw fits, into a first portion and into a second portion. When the screw connection is tightened, the width of the slot is reduced, as a result of which the clamp fit connection is clamped.

The invention advantageously includes a vehicle, in particular a motor vehicle with a body and at least one wheel carrier as just described. The component which is fastened in the clamp fit connection connects the wheel carrier to the body. Accordingly, the component is advantageously designed as a suspension strut or the like.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
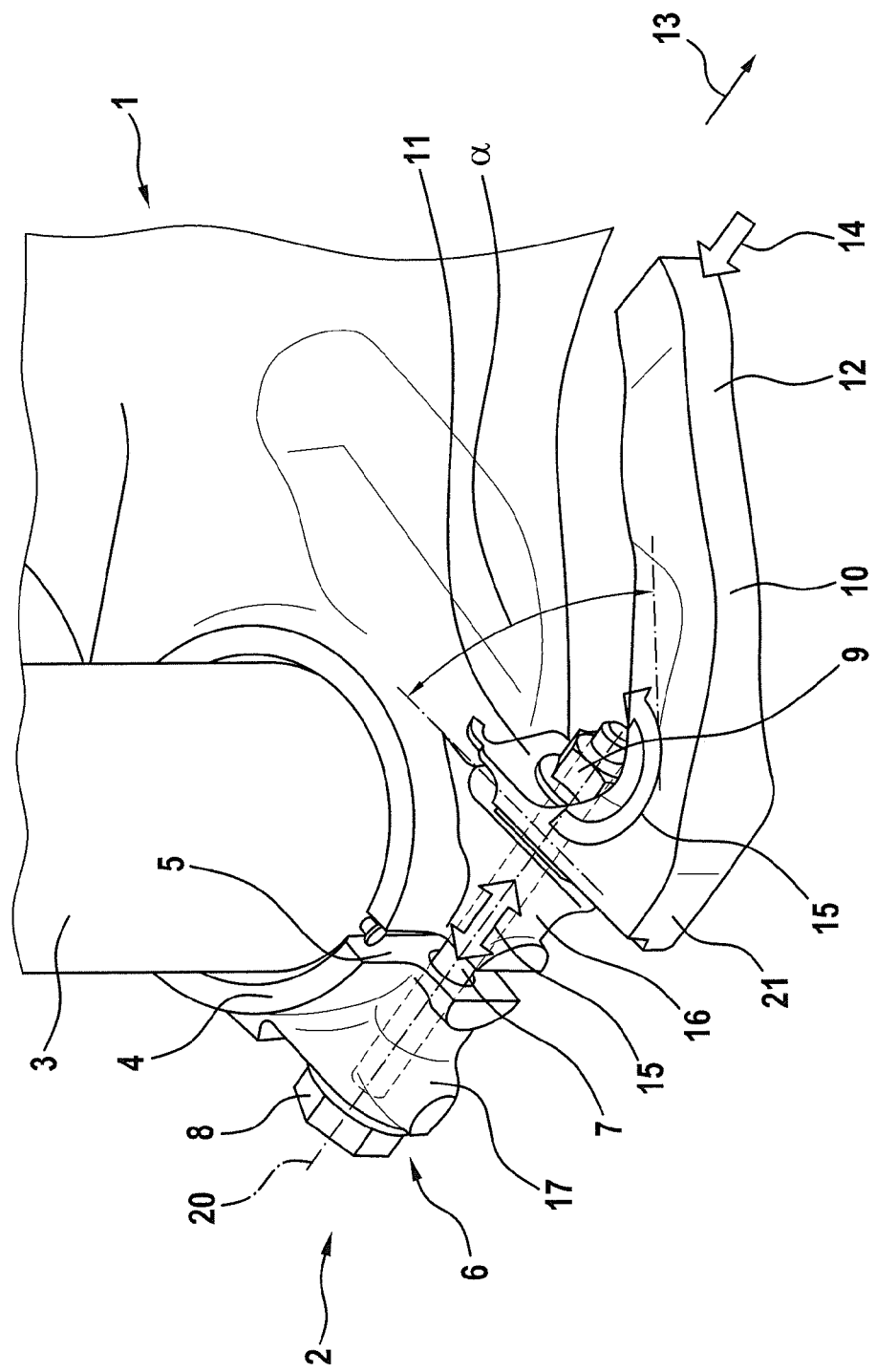
FIG. 1 is a perspective view of an excerpt of an exemplary embodiment of a wheel carrier according to the invention.
Figure 2:
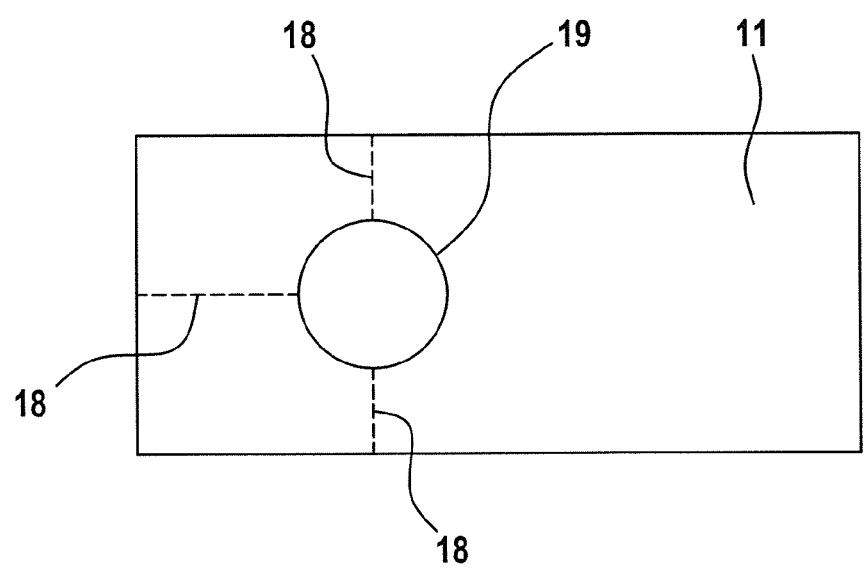
FIG. 2 is a schematically simplified detail of the lever.
Figure 3:
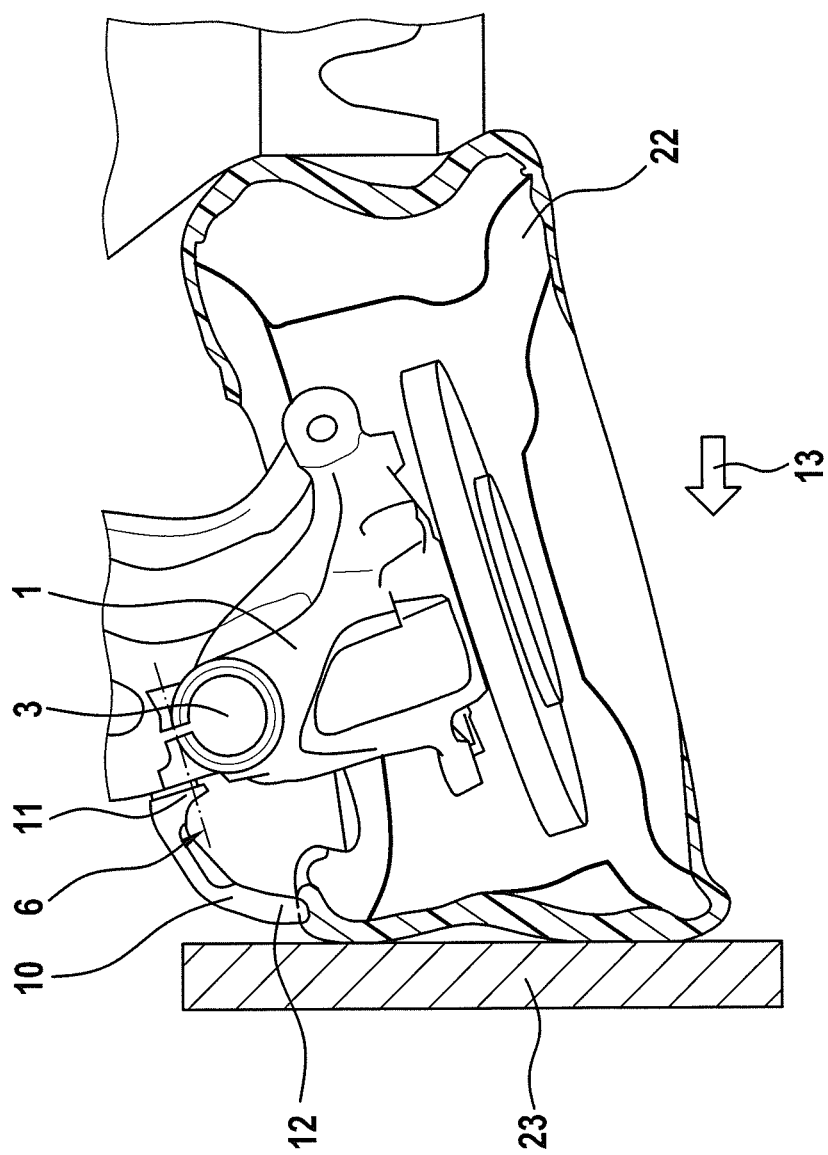
FIG. 3 illustrates the wheel carrier according to the exemplary embodiment of the invention during a crash.

An exemplary embodiment of a wheel carrier 1 of a passenger vehicle is shown with reference to FIGS. 1 to 3. The wheel carrier 1 serves primarily for rotatably holding a wheel of the vehicle. The wheel carrier 1 can also be designed here as a pivot bearing. The pivot bearing combines the conventional wheel carrier with a link.

FIG. 1 shows a front, left wheel carrier by way of example. The wheel carrier 1 includes a clamp fit connection 2. A further component 3 is inserted in the clamp fit connection 2. The further component 3 is designed here as a suspension strut. The suspension strut connects the wheel carrier 1 to a body (not illustrated) of the vehicle.

The clamp fit connection 2 includes a clip 4 which is formed integrally in the wheel carrier 1. The clip 4 forms a slot 5. The slot 5 in turn divides the clamp fit connection 2 into a first portion 16 and into a second portion 17.

A hole is formed in the two portions 16, 17. A screw 7 of a screw connection 6 fits in the hole. The screw 7 has a head 8. On the side opposite the head 8, a nut 9 is screwed onto the screw 7. By tightening of the screw connection 6, the width of the slot 5 is reduced, as a result of which the further component 3 is clamped.

Furthermore, a lever 10 is fastened to the clamp fit connection 2 by the screw connection 6. In the exemplary embodiment shown, the lever 10 is fastened to the nut 9. However, the lever 10 could equally also be clamped under the head 8 of the screw 7.

The lever 10 is divided into a fastening portion 11 and into an impact portion 12. The fastening portion 11 has a fastening hole 19 (see FIG. 2). The screw 7 protrudes though the fastening hole 19. Accordingly, the fastening portion 11 is substantially located under the nut 9.

A direction of travel 13 of the vehicle is shown in FIGS. 1 and 3. FIG. 3 shows an example of a crash in which the vehicle drives against a barrier 23. The barrier 23 which is illustrated, does not have to strike directly against the wheel 22. On the contrary, the vehicle body can also strike against the barrier 23, as a result of which the front structure of the body is deformed and, consequently, the wheel 22 is also deformed. As seen with reference to FIG. 3, it is crucial that, during the crash, by way of the deformation of the vehicle, part of the vehicle moves against the impact portion 12 of the lever 10. As a result, the action of force 14 shown in FIG. 1 against the impact portion 12 of the lever 10 occurs.

The two arrows 15 in FIG. 1 illustrate the effect of the action of force 14 on the lever 10. According to the two arrows 15, the action of force 14 on the lever 10 first of all causes the screw 6 to elongate along the longitudinal axis 20 thereof, and then the fastening portion 11 to break out from under the nut 9. Both the extension of the screw 6 and the breaking out of the fastening portion 11 result in a loss of prestressing force of the screw 6. As a result, the clamp fit connection 2 is released.

According to FIG. 1, the fastening portion 11 merges at a transition 21 into the rest of the lever 10, in particular into the impact portion 12. The outer end of the impact portion 12 and this transition 21 are located on two opposite sides of the longitudinal axis 20 of the screw 7. For this purpose, the fastening portion 11 and the impact portion 12 are advantageously at the angle α with respect to each other. The angle α is less than 90°.

FIG. 2 shows merely the fastening portion 11 of the lever 10 with the fastening hole 19, in a schematically simplified detail. Material recesses 18 are illustrated purely schematically in this illustration by the dashed lines. The material recesses 18 can also be designed as material taperings. It is crucial that, in a preferred embodiment here with at least one material recess 18 or material tapering, at least one predetermined breaking point is formed such that breaking out of the fastening portion is ensured. One or more predetermined breaking points can be formed here. In particular, the predetermined breaking point is formed as at least one longitudinal slot or a groove in the fastening portion 11.

LIST OF REFERENCE SIGNS

1 Wheel carrier, in particular pivot bearing
2 Clamp fit connection
3 Further component, in particular suspension strut or the like
4 Clip
5 Slot
6 Screw connection
7 Screw
8 Head
9 Nut
10 Lever
11 Fastening portion
12 Impact portion
13 Direction of travel
14 Action of force
15 Arrows
16 First portion
17 Second portion
18 Material recess, in particular longitudinal slot
19 Fastening hole
20 Longitudinal axis
21 Transition 22 Wheel
23 Barrier/body
α Angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel carrier of a vehicle having a clamp fit connection to a further component, comprising:
a screw connection having a screw, the screw connection being configured to clamp the clamp fit connection;
a lever having a fastening portion and an impact portion, wherein
the fastening portion is fastened under a head of the screw or under a nut of the screw connection,
the impact portion protrudes from the fastening portion such that, in an event of a crash of the vehicle and associated deformation, a portion of the vehicle causes a force to act on the impact portion in order to at least partially release the screw connection, and
the fastening portion is configured to at least partially break out from under the head or under the nut during the action of the force on the lever.

2. The wheel carrier according to claim 1, wherein the further component is a suspension strut.

3. The wheel carrier according to claim 1, wherein one or more predetermined breaking points are formed in the fastening portion of the lever to enable the fastening portion to break out from under the head or the nut.

4. The wheel carrier according to claim 1, wherein at least one material tapering or material recess is formed in the fastening portion in order to allow the fastening portion to break out.

5. The wheel carrier according to claim 4, wherein the material tapering or the material recess at least partially extends under the head or under the nut.

6. The wheel carrier according to claim 4, wherein
a fastening hole is arranged in the fastening portion of the lever,
the screw is inserted in the fastening hole, and
the material tapering or material recess is formed as far as an edge of the fastening hole.

7. The wheel carrier according to claim 6, wherein the material recess is configured as a longitudinal slot or a groove in the fastening portion.

8. The wheel carrier according to claim 6, wherein the material tapering or the material recess at least partially extends under the head or under the nut.

9. The wheel carrier according to claim 1, wherein one end of the impact portion of the lever and a transition region of the fastener portion into the impact portion lie on opposite sides of a longitudinal axis of the screw.

10. The wheel carrier according to claim 1, wherein the clamp fit connection comprises a clip in the wheel carrier, the clip having a slot dividing the clamp fit connection into first and second portions.

11. The wheel carrier according to claim 10, wherein the screw of the screw connection is configured to extend across the slot of the clip.

12. A wheel carrier of a vehicle having a clamp fit connection to a further component, comprising:
a screw connection having a screw, the screw connection being configured to clamp the clamp fit connection;
a lever having a fastening portion and an impact portion, wherein
the fastening portion is fastened under a head of the screw or under a nut of the screw connection,
the impact portion protrudes from the fastening portion such that, in an event of a crash of the vehicle and associated deformation, a portion of the vehicle causes a force to act on the impact portion in order to at least partially release the screw connection,
the fastening portion is configured to at least partially break out from under the head or under the nut during the action of the force on the lever, and
a material recess is formed in the fastening portion in order to allow the fastening portion to break out,
the material recess is configured as a longitudinal slot or a groove in the fastening portion.

13. A wheel carrier of a vehicle having a clamp fit connection to a further component, comprising:
a screw connection having a screw, the screw connection being configured to clamp the clamp fit connection;
a lever having a fastening portion and an impact portion, wherein
the fastening portion is fastened under a head of the screw or under a nut of the screw connection,
the impact portion protrudes from the fastening portion such that, in an event of a crash of the vehicle and associated deformation, a portion of the vehicle causes a force to act on the impact portion in order to at least partially release the screw connection, and
the fastening portion is configured to at least partially break out from under the head or under the nut during the action of the force on the lever,
the impact portion of the lever is inclined relative to the fastening portion by an angle of less than 90°.

14. The wheel carrier according to claim 13, wherein one end of the impact portion of the lever and a transition region of the fastener portion into the impact portion lie on opposite sides of a longitudinal axis of the screw.

15. A vehicle, comprising:
a vehicle body;
a wheel carrier; and
a component connecting the wheel carrier to the body, wherein
the wheel carrier has a clamp fit connection to the component, the wheel carrier comprising:
a screw connection having a screw, the screw connection being configured to clamp the clamp fit connection;
a lever having a fastening portion and an impact portion, wherein
the fastening portion is fastened under a head of the screw or under a nut of the screw connection,
the impact portion protrudes from the fastening portion such that, in an event of a crash of the vehicle and associated deformation, a portion of the vehicle causes a force to act on the impact portion in order to at least partially release the screw connection, and
the fastening portion is configured to at least partially break out from under the head or under the nut during the action of the force on the lever.

16. The vehicle according to claim 15, wherein the component is a suspension strut.

17. The wheel carrier according to claim 16, wherein at least one material tapering or material recess is formed in the fastening portion in order to allow the fastening portion to break out.

18. The wheel carrier according to claim 16, wherein one or more predetermined breaking points are formed in the fastening portion of the lever to enable the fastening portion to break out from under the head or the nut.

19. The wheel carrier according to claim 18, wherein one end of the impact portion of the lever and a transition region of the fastener portion into the impact portion lie on opposite sides of a longitudinal axis of the screw.

20. The wheel carrier according to claim 19, wherein the clamp fit connection comprises a clip in the wheel carrier, the clip having a slot dividing the clamp fit connection into first and second portions.

* * * * *